United States Patent [19]
Honda

[11] Patent Number: 6,052,543
[45] Date of Patent: *Apr. 18, 2000

[54] CARTRIDGE LOADING APPARATUS FOR A CAMERA

[75] Inventor: Takanori Honda, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/921,543

[22] Filed: Sep. 2, 1997

Related U.S. Application Data

[63] Continuation of application No. 08/573,757, Dec. 18, 1995, abandoned, which is a continuation of application No. 08/227,376, Apr. 14, 1994, abandoned.

[30] Foreign Application Priority Data

Apr. 15, 1993 [JP] Japan .................................. 5-111126

[51] Int. Cl.⁷ .................................................. G03B 17/06
[52] U.S. Cl. ............................................................ 396/538
[58] Field of Search ................................ 396/535, 536, 396/538, 389

[56] References Cited

U.S. PATENT DOCUMENTS

| | | | |
|---|---|---|---|
| 4,998,123 | 3/1991 | Smart | 354/275 |
| 5,032,861 | 7/1991 | Pagano | 354/275 |
| 5,079,579 | 1/1992 | Pagano et al. | 354/288 |
| 5,122,820 | 6/1992 | Pagano et al. | 354/21 |
| 5,274,412 | 12/1993 | Stoneham et al. | 354/275 |
| 5,280,327 | 1/1994 | Stoneham et al. | 354/275 |
| 5,307,099 | 4/1994 | Kawamura et al. | 354/21 |
| 5,347,334 | 9/1994 | Smart et al. | 354/275 |

FOREIGN PATENT DOCUMENTS

| | | |
|---|---|---|
| 0467644 | 1/1992 | European Pat. Off. . |
| 4204839 | 7/1992 | Japan . |

OTHER PUBLICATIONS

Patent Abstracts Of Japan, vol. 16, No. 543 (p.–1451), Nov. 12, 1992.

*Primary Examiner*—Safet Metjahic
*Assistant Examiner*—Michael Dalakis
*Attorney, Agent, or Firm*—Fitzpatrick, Cella, Harper & Scinto

[57] ABSTRACT

A camera or a cartridge loading apparatus for a camera includes a determination mechanism for determining whether a cartridge is usable, a supporting member for movably supporting the determination mechanism to be move by the cartridge, and a prevention mechanism for prevention the determination mechanism from exerting a force on the supporting member.

28 Claims, 6 Drawing Sheets

FIG. 8

CARTRIDGE LOADING APPARATUS FOR A CAMERA

This application is a continuation of application Ser. No. 08/573,757 filed Dec. 18, 1995, which is a continuation of application Ser. No. 08/227,376 filed Apr. 14, 1994, both now abandoned.

BACKGROUND OF THE INVENTION

1. Field of the Invention

The invention relates to an improvement of a cartridge loading apparatus for a camera.

2. Related Background Art

Generally, a film cartridge is known such that it is loaded into a camera by feeding film from the cartridge in which the film is completely stored. However, in the camera using a cartridge of this type, an exposed film cartridge may have been inadvertently loaded. Therefore, there is also known a camera as disclosed in the U.S. Pat No. 4,998,123, in which the camera provides a lock-out mechanism in order to eliminate the above-mentioned problem.

The mechanism includes a lock-out lever which is rotatable about a shaft and is biased by a spring in one side direction. With this kind of lock-out lever, if one attempts to load an exposed film cartridge into loading of the camera, the lock-out lever connects with the cartridge to prevent the cartridge.

On the other hand, when an unused film cartridge is loaded, the lock-out lever rotates against the spring force to avoid the cartridge, whereby the cartridge can be loaded into the camera.

However, in the conventional camera having the mechanism mentioned above, if a user incorrectly loads an exposed or unusable film cartridge into a camera, due to the structure of the mechanism, an excessive force may be applied to the lock-out lever and the shaft, thereby requiring a higher rigidity of each component and making the mechanism big.

SUMMARY OF THE INVENTION

One aspect of the present invention provides a camera or a cartridge loading apparatus for a camera includes determination means, to move in response to a cartridge being loaded, for determining whether the cartridge is unusable, supporting means for movably supporting the determination means, and prevention means for preventing a movement of the determination means, the prevention means being provided independent from the supporting means.

Other aspects of the present invention will be shown hereinbelow by taking shapes in the preferred concrete embodiments.

DESCRIPTION OF THE PREFERRED EMBODIMENTS

Referring to the drawings, preferred embodiments according to the present invention will be described hereinbelow.

Figure 4:
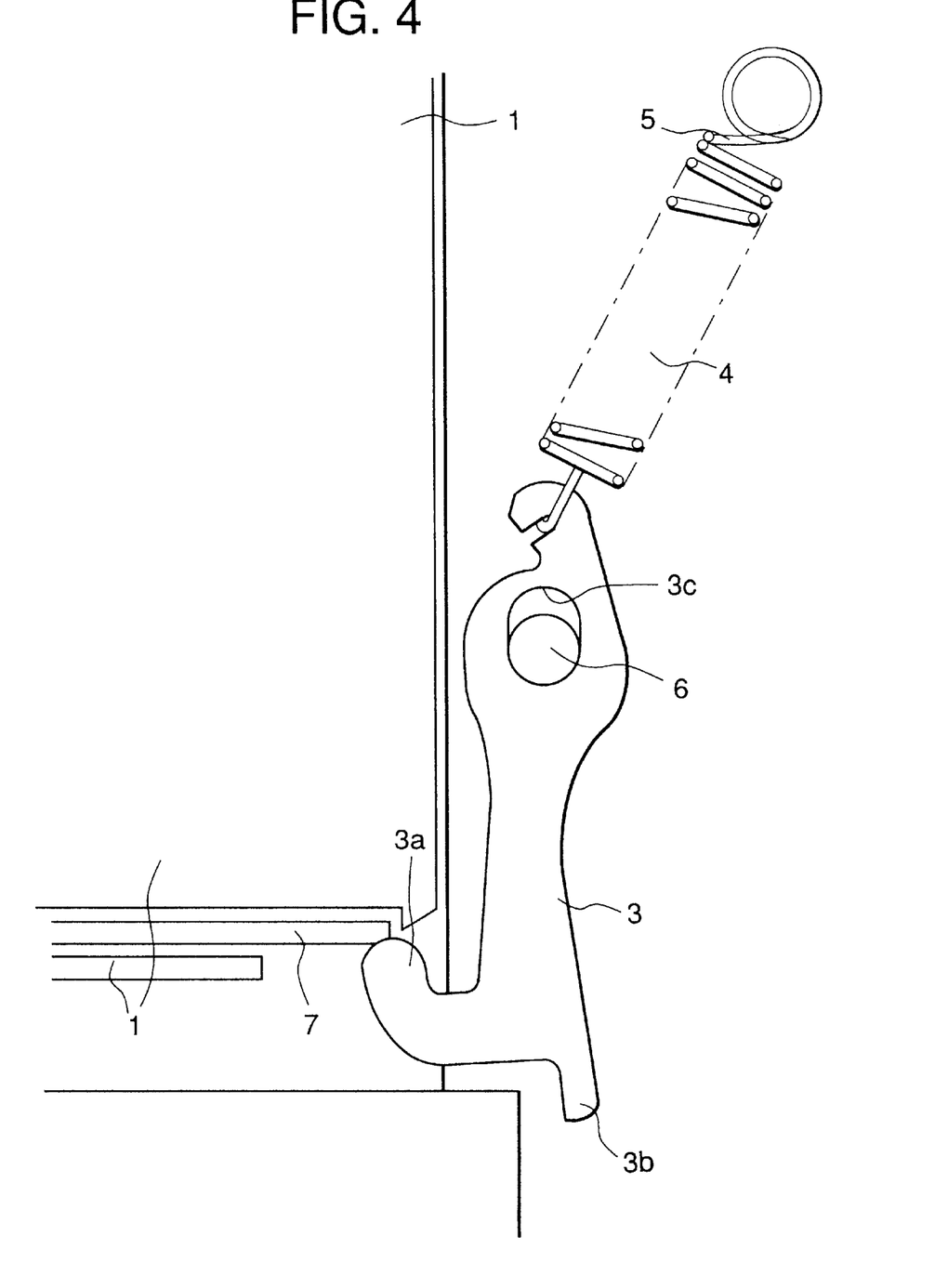
FIG. 4 is a enlarged cross-sectional view showing loading of the usable film cartridge.
Figure 5:
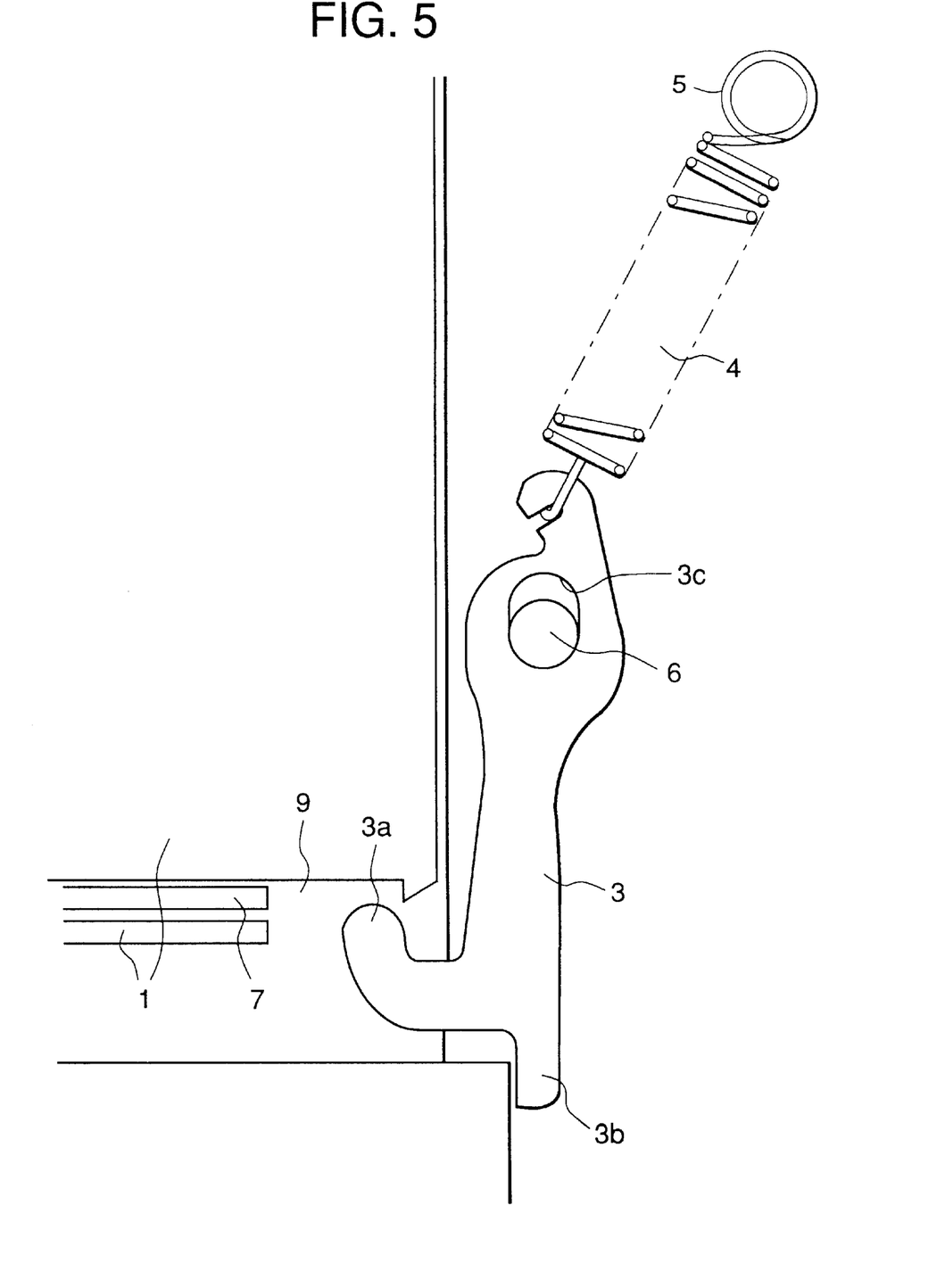
FIG. 5 is a enlarged cross-sectional view showing loading of the unusable film cartridge.

A film cartridge 1 used in the embodiments, as shown in FIGS. 4 and 5, includes a disk 7 having a notch part on the periphery thereof, and the disk 7 is attached to an unillustrated rotation shaft of the film cartridge 1. The disk 7 changes a stop position of the rotation thereof, thereby forming either a groove on the bottom side of the film cartridge 1 or a cover thereon.

Figure 1:
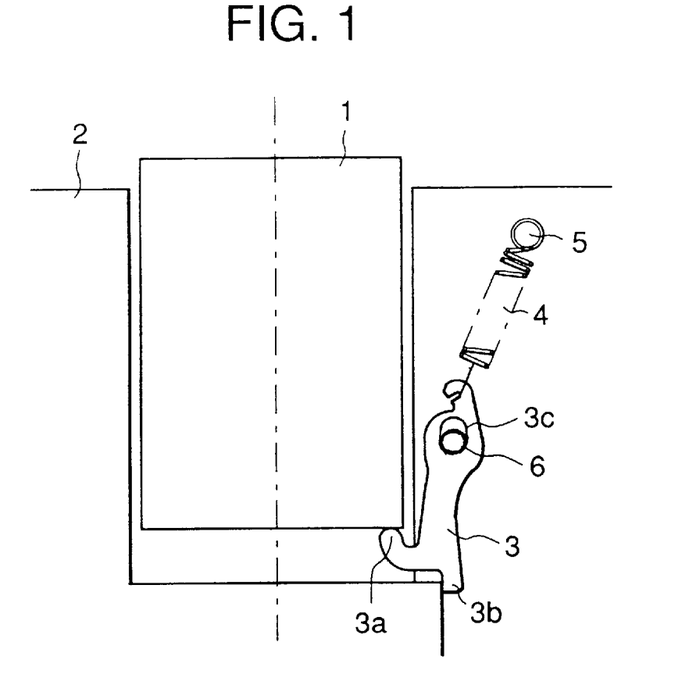
FIG. 1 is a cross-sectional view showing a state of a film cartridge being loaded into a film cartridge loading portion of a camera according to a first embodiment of the present invention.

FIGS. 1 to 7 show a structure of a film cartridge loading portion according to a first embodiment of the present invention. Referring to FIG. 1, there are provided a film cartridge 1 which completely stores a film therein and thrusts out the film therefrom, a cartridge chamber 2 of a camera body, a lock-out lever 3 for preventing cartridge loading with respect to an exposed or unusable film cartridge, a projection 3a which is put in a lock groove 9, as shown in FIG. 5, in case of the exposed or unusable film cartridge, a rotating connection-lock part 3b of the lock-out lever 3, an oval hole 3c, a spring 4 for biasing lock-out lever 3 in one direction (towards the upper side in the diagonal right-hand), a spring shaft 5 fixed on the body, a lever shaft 6 fixed on the body as rotation axis of the lock-out lever 3, and in FIG. 4, the disk 7 for forming the presence of the lock groove 9, changing the stop position in response to whether the loaded film is unused or exposed.

Figure 6:
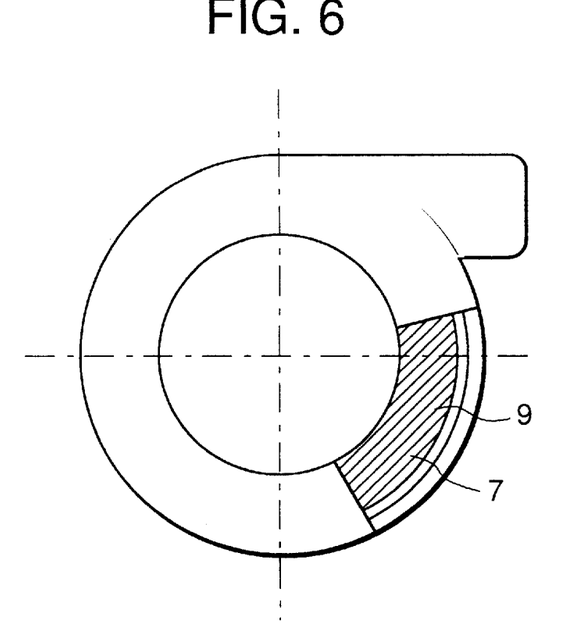
FIG. 6 is a plan view of the usable film cartridge used in the first embodiment of the present invention as it is seen from the bottom side thereof.

As shown in FIG. 4, when a usable film cartridge is loaded, the disk 7 is positioned so that it does not form the lock groove 9. As shown in FIG. 5, when an unusable film cartridge is loaded, the disk 7 is positioned to form the lock groove 9. FIG. 6 is a plan view of the usable film cartridge as shown in FIG. 4 as it is seen from the bottom side thereof and FIG. 7 is a plan view of the unusable film cartridge as shown in FIG. 5.

Figure 7:
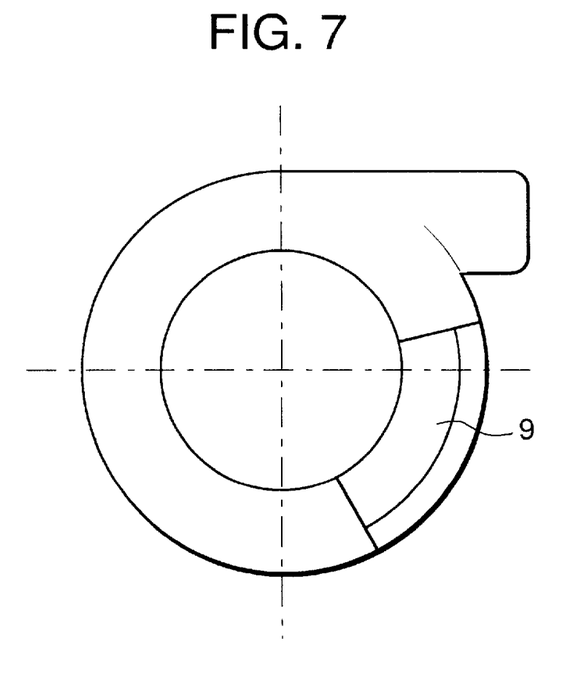
FIG. 7 is a plan view of the unusable film cartridge used.

FIGS. 6 and 7 show whether or not the disk 7 is positioned at the lock groove 9. The position of the disk determines whether or not the projection 3a of the lock-out lever 3 can be inserted into the lock groove 9.

Next, an actual operation with respect to such a lock-out mechanism will be described. Referring to FIG. 1, when the film cartridge 1 is being loaded, that is, when the lock-out lever 3 is in a normal state, the lock-out lever 3 receives clockwise mechanical power from the spring 4. In this state, therefore, the rotating connection-lock part 3b is pressed against the camera body to restrict the rotation of the lock-out lens 3.

Figure 2:
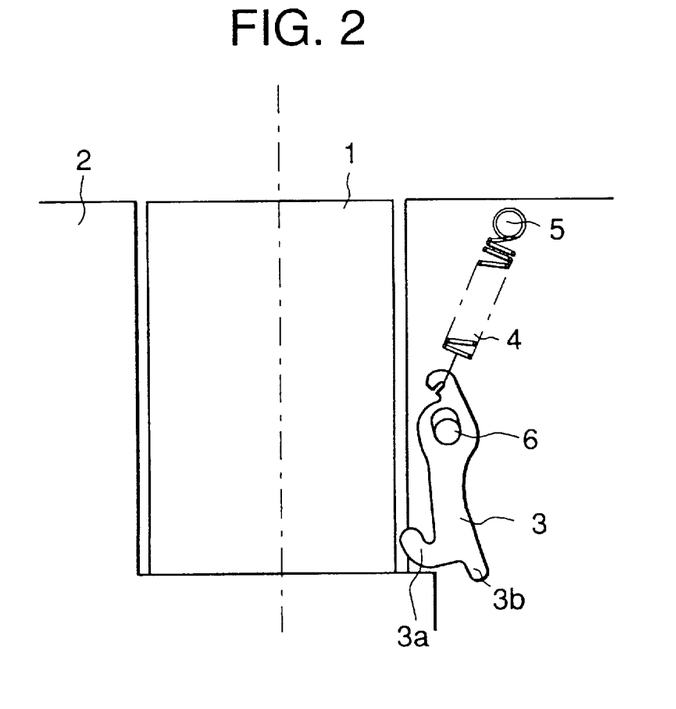
FIG. 2 is a cross-sectional view showing a state of loading completion of a usable film cartridge.

Next, referring to FIG. 2, when the loaded cartridge is usable, the projection 3a of the lock-out lever 3 contacts the disk 7 of the film cartridge 1 as shown in FIG. 4 and the lock-out lever 3 is rotated counterclockwise around the lever shaft 6. As a result, the film cartridge 1 makes the lock-out lever 3 rotate counterclockwise, whereby the film cartridge 1 is completely loaded in a desired position of the cartridge chamber 2.

Figure 3:
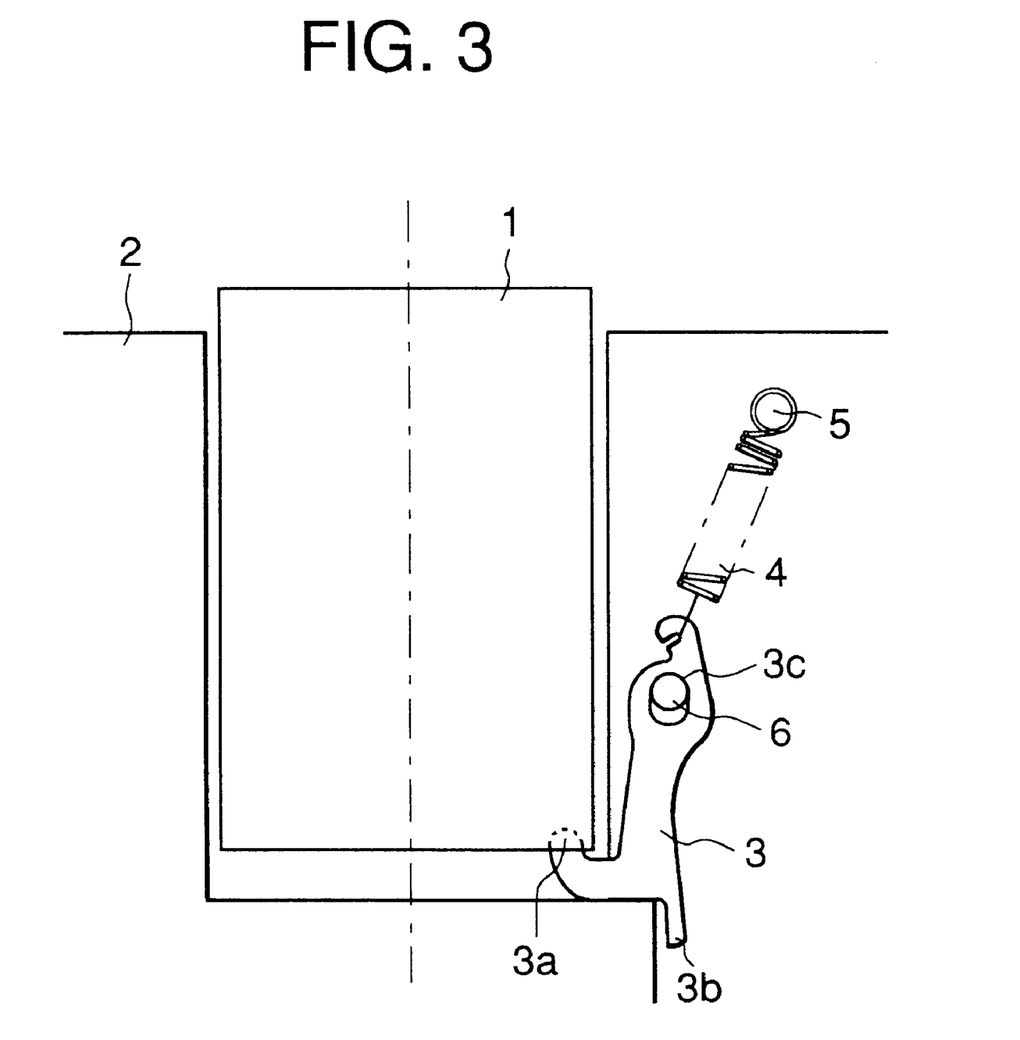
FIG. 3 is a cross-sectional view showing a state of loading prevention of an unusable film cartridge.

As shown in FIG. 3, when the loaded cartridge 1 is unusable, the projection 3a of the lock-out lever 3 is inserted in the lock groove 9 formed by the difference in the stop position of the disk 7 and the rotation of the lock-out lever 3 is restricted. Also, when the loaded cartridge is more deeply loaded, the lock-out lever 3 is moved downwardly along the oval hole 3c to strike the bottom side of the cartridge chamber of the camera body (structure member of the camera), thereby preventing the further approach of the unusable cartridge into the cartridge chamber 2, and informing a user that the cartridge being loaded is unusable. That is, the lock-out lever 3 strikes the bottom side of the cartridge chamber of the camera body due to the excessive force generated by the loading operation and prevents further downward movement, whereby a load given from the oval hole 3c of the lock-out lever 3 to the lever shaft 6 is reduced.

FIG. 4 is an enlarged diagram adjacent to the lock-out lever 3 at the time when the usable film cartridge is loaded. Referring to FIG. 4, the disk 7 of the film cartridge 1 covers the groove therewith to prevent insertion of the projection 3a of the lock-out,lever 3 into the groove. Therefore, though contact with the loaded usable film cartridge, the lock-out lever 3 resists the spring 4 to rotate counterclockwise around the lever shaft 6.

FIG. 5 is an enlarged diagram adjacent to the lock-out lever 3 when the unusable film cartridge is loaded. Referring to FIG. 5, a notch part provided in the disk 7 of the film cartridge 1 forms the lock groove 9 in which the projection 3a of the lock-out lever 3 in which.

Figure 8:
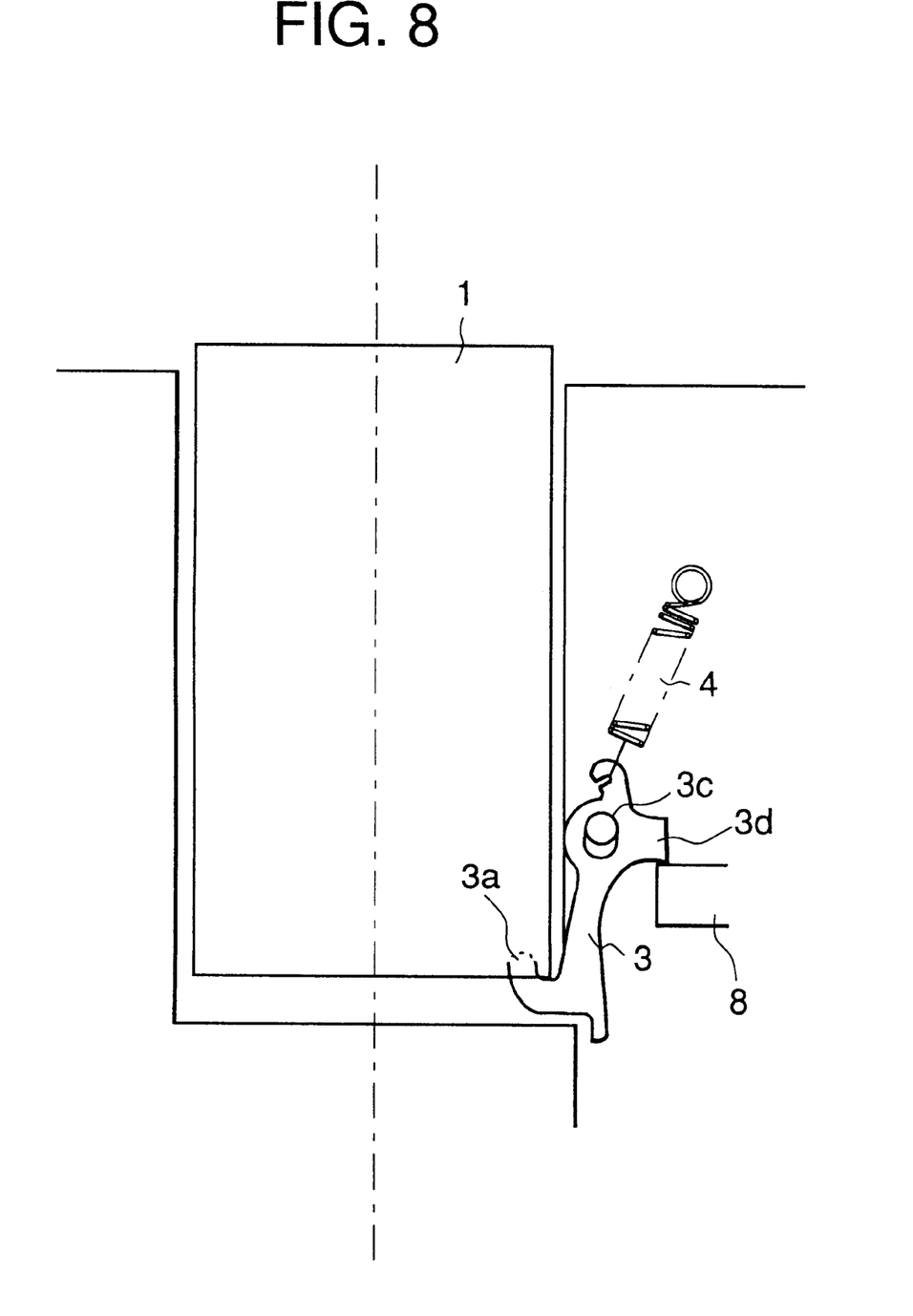
FIG. 8 is a cross-sectional view showing a structure of a film cartridge loading portion of a camera according to a second embodiment of the present invention.

FIG. 8 is a diagram showing a structure of a film cartridge loading portion of a camera according to a second embodiment of the present invention. In FIG. 8, elements that are identical to those shown in the first embodiment adopt the same numerals and a description thereof is omitted. In the drawing, there are provided a connection-lock part 3d for preventing downward movement of the lock-out lever 3 and a projection 8 of the camera body.

In each of the above embodiments, as a method for inhibiting the loading of an unusable cartridge, the invention is not limited as to the shape of the lock-out lever 3. If the present invention can be applied, another shape, for example a slide cam, is included in the present invention.

Further, in case 90 unusable cartridge is loaded, as a member which the lock-out lever 3 contacts to inhibit movement thereof, a member other than the structure member of the camera of the above embodiments can be included in the present invention.

In this embodiment, the different point from the first embodiment is that, when the unusable film cartridge is loaded, the projection 3a of the lock-out lever 3 is inserted into the groove to move lock-out lever 3 downwardly along the oval hole 3c, and upon this movement the connection-lock part 3d strikes the projection 8 of the body to prevent downward movement of the lock-out lever 3. Also, the other things are the same as those shown in the first embodiment.

Furthermore, according to the present invention, there can be applied various types of cartridge other than the cartridge shown in the embodiments, cartridges including image recording mediums other than film and also, other cartridges and loading materials other than a cartridge.

Furthermore, the present invention, can be applied to a single-lens reflex camera, a lens-shutter camera, a video camera and also, an optical apparatus other than camera and other apparatus.

Furthermore, according to the present invention, it is to be understood that the loading direction of the cartridge is not limited to the above-mentioned embodiments.

Furthermore, according to the present invention, there can be provided a combination of each embodiment or these technical elements corresponding to a predetermined requirement.

While the present invention has been described with respect to what is presently considered to be the preferred embodiments, it is to be understood that the invention is not limited to the disclosed embodiments. To the contrary, the invention is intended to cover various modifications and equivalent arrangement included within the spirit and scope of the appended claims. The scope of the following claims is to be accorded the broadest interpretation so as to encompass all such modifications and equivalent structures and functions.

What is claimed is:

1. A cartridge loading apparatus comprising:
    a determination device that is engagable with a cartridge to determine whether the cartridge is usable or unusable;
    a support structure that supports said determination device so that said determination device is contactable by a usable cartridge and movable when contacted by the usable cartridge, and is contactable by an unusable cartridge and movable when contacted by the unusable cartridge; and
    a prevention device that prevents a continued movement of said determination device, which continued movement exerts a force of movement of an unusable cartridge on said support structure.

2. An apparatus according to claim 1, wherein the cartridge includes an image recording medium.

3. An apparatus according to claim 2, wherein the image recording medium includes a film.

4. An apparatus according to claim 1, wherein said determination device includes projection means for engaging the cartridge.

5. An apparatus according to claim 1, wherein said determination device includes means for varying a type of movement of said determination device in accordance with whether the cartridge is unusable.

6. An apparatus according to claim 1, wherein said determination device includes means for engaging an unusable cartridge and for moving together with the unusable cartridge.

7. An apparatus according to claim 1, wherein said support structure includes means for rotatably supporting said determination device.

8. An apparatus according to claim 7, wherein said support structure comprises means for urging said determination device in a predetermined direction.

9. An apparatus according to claim 8, wherein said support structure includes means for slidably supporting said determination device.

10. An apparatus according to claim 9, wherein said support structure further comprises means for urging said determination device in a predetermined direction.

11. An apparatus according to claim 1, further comprising means for urging said determination device in a predetermined direction.

12. An apparatus according to claim 11, wherein said prevention device includes means for inhibiting loading of the cartridge by preventing a movement of said determination device necessary for loading of the cartridge.

13. An apparatus according to claim 11, wherein said determination device includes means for indicating that a cartridge being loaded is unusable by preventing a movement of said determination device necessary for loading the cartridge.

14. An apparatus according to claim 1, wherein said prevention device includes a structural member of a camera.

15. A camera comprising:

a determination device that is engagable with a cartridge to determine whether the cartridge is usable or unusable;

a support structure that supports said determination device so that said determination device is contactable by a usable cartridge and movable when contacted by the usable cartridge, and is contactable by an unusable cartridge and movable when contacted by the unusable cartridge; and a prevention device that prevents a continued movement of said determination device, which continued movement exerts a force of movement of an unusable cartridge on said support structure.

16. A camera according to claim 15, wherein the cartridge includes an image recording medium.

17. A camera according to claim 16, wherein the image recording medium includes a film.

18. A camera according to claim 15, wherein said determination device includes projection means for engaging the cartridge.

19. A camera according to claim 15, wherein said determination device includes means for varying a movement state in accordance with whether the cartridge is unusable.

20. A camera according to claim 15, wherein said determination device includes means for engaging an unusable cartridge and for moving together with the unusable cartridge.

21. A camera according to claim 15, wherein said support structure includes means for rotatably supporting said determination device.

22. A camera according to claim 21, wherein said support structure comprises means for urging said determination device in a predetermined direction.

23. A camera according to claim 22, wherein said support structure includes means for slidably supporting said determination device.

24. A camera according to claim 23, wherein said support structure further comprises means for urging said determination device in a predetermined direction.

25. A camera according to claim 15, further comprising means for urging said determination device in a predetermined direction.

26. A camera according to claim 25, wherein said prevention device includes means for inhibiting loading of the cartridge by preventing a movement of said determination device necessary for loading of the cartridge.

27. A camera according to claim 15, wherein said determination device includes means for indicating that the cartridge being loaded is unusable by preventing a movement of said determination device necessary for loading the cartridge.

28. A camera according to claim 15, wherein said prevention device includes a structural member of the camera.

* * * * *

UNITED STATES PATENT AND TRADEMARK OFFICE
CERTIFICATE OF CORRECTION

PATENT NO. : 6,052,543
DATED : April 18, 2000
INVENTOR(S) : TAKANORI HONDA

It is certified that error appears in the above-identified patent and that said Letters Patent is hereby corrected as shown below:

Title page,
[56] References Cited

FOREIGN PATENT DOCUMENTS

"4204839" should --4-204839--.

[57] ABSTRACT

Line "move" should read --moved--.
Line "prevention" should read --preventing--.

Column 3

Line 20, "lock-out,lever" should read --lock-out lever--.
Line 28, "in which." should read --is inserted.--
Line 42, "90" should read --an--.

Signed and Sealed this

Tenth Day of April, 2001

Attest:

NICHOLAS P. GODICI

*Attesting Officer*   Acting Director of the United States Patent and Trademark Office